United States Patent [19]

Stuart

[11] Patent Number: 4,998,441
[45] Date of Patent: Mar. 12, 1991

[54] FORCE AND TORQUE MEASUREMENT SYSTEM

[75] Inventor: Keith O. Stuart, Cypress, Calif.

[73] Assignee: Aura Systems, Inc., El Segundo, Calif.

[21] Appl. No.: 378,152

[22] Filed: Jul. 11, 1989

[51] Int. Cl.$^5$ .................. G01C 71/12; G01L 5/16
[52] U.S. Cl. .................. 73/862.04; 73/178 R
[58] Field of Search ............ 73/178 R, 178 H, 178 T, 73/517 A, 517 B, 517 R, 654, 431, 862.04

[56] References Cited

U.S. PATENT DOCUMENTS

| | | | |
|---|---|---|---|
| 4,522,074 | 6/1985 | Hafner | 73/862.04 |
| 4,583,404 | 4/1986 | Bernard et al. | 73/517 B |
| 4,711,125 | 12/1987 | Morrison | 73/178 |
| 4,799,386 | 1/1989 | Bernard et al. | 73/517 B |

*Primary Examiner*—Donald O. Woodiel
*Attorney, Agent, or Firm*—Schiller, Pandiscio & Kusmer

[57] ABSTRACT

A system for measuring a force applied to a mass so that the magnitude and direction of the force can be determined as well as the torque about three orthogonal axes. The system comprises an electromagnetic bearing support system for electromagnetically suspending the mass in a predetermined position and orientation relative to a three-dimensional coordinate system defining three mutually perpendicular axes. The forces applied to the mass are measured by measuring the force components of each applied force along one of the axes so that the one axis defines a reference axis. The force components in the direction of the two remaining force components are each measured at two locations along the reference axis. The roll of the mass about the reference axis is measured and the yaw and pitch of the mass about the two remaining axes is determined as a function of the two components in the direction of the of each of the two remaining axes.

11 Claims, 12 Drawing Sheets

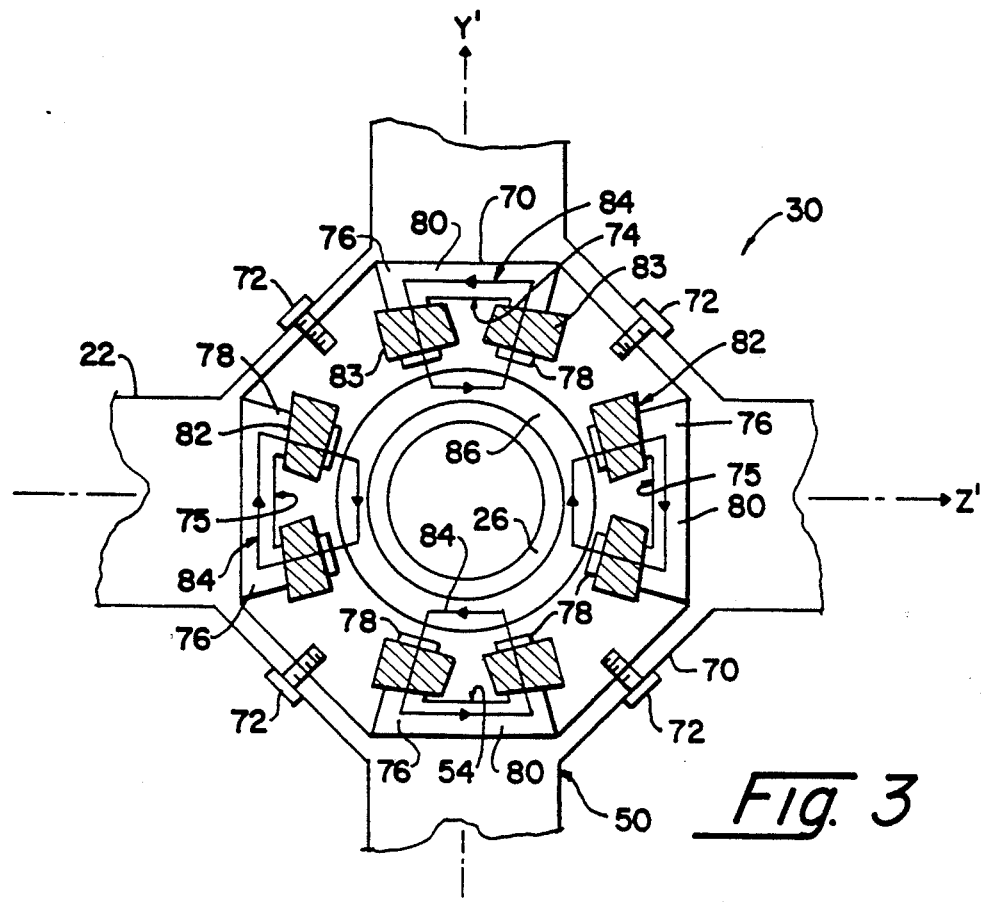
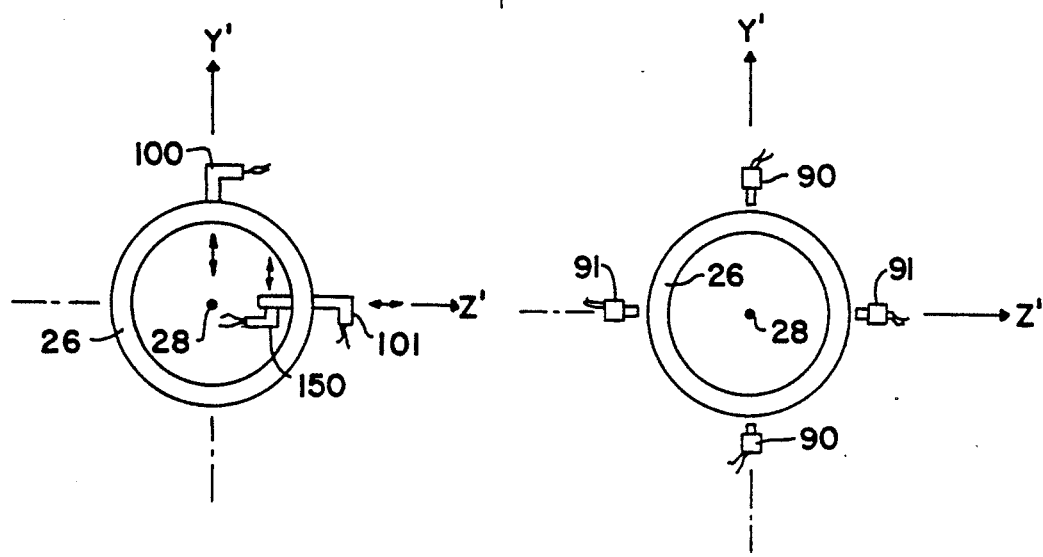
Fig. 3
Fig. 5
Fig. 4

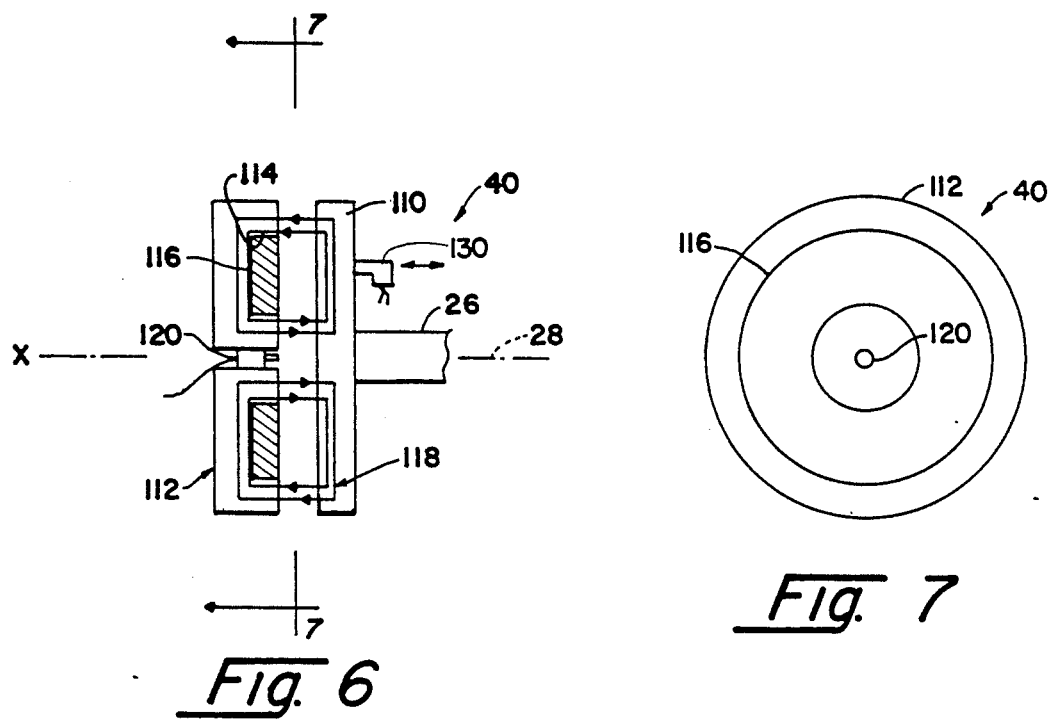
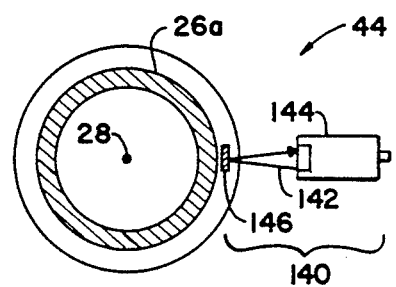

FORCE AND TORQUE MEASUREMENT SYSTEM

The present invention generally relates to a system for measuring forces applied to a mass, and more specifically to a system for acquiring data, over a predetermined time period, representative of forces and torques applied to the mass during the time period, and for subsequently using the data to determine the forces and torques.

For various reasons, such as measuring the thrust provided by a propellant exhausted from a vessel or testing the integrity of a structure to force-induced stresses, it is often desirable to measure forces and torques exerted by or applied to the vessel or structure. Various facilities have been developed to measure forces applied to or provided by such structures so as to generate historical data relating to the application of the forces during the test period. Typically, facilities for measuring thrust provided by a propellant each includes a single piezoelectric load cell for sensing forces applied to the mass in one direction, since it is generally thought that thrust need be measured in only one direction. However, as propellant is exhausted, forces and torques can actually be applied to the mass with respect to all six degrees of freedom. Further, the load cells tend to have a limited dynamic range as well as a limited bandwidth, while the forces and torques can vary over a large dynamic range and over a large frequency bandwidth in a very short time. Sensing forces only in one direction with a piezoelectric load cell provides severely limited information so that information can be lost if force and torque components are applied in directions normal to the direction of sensitivity of the load cell, or if outside the dynamic range or frequency bandwidth of the load cell. Further, vibrations and resonances induced in the structure during the measurement period severely limit the accuracy of these conventional facilities, since portions of these vibrations and resonances can be sensed by the cell and can therefore affect the performance and accuracy of these facilities.

Accordingly, it is a general object of the present invention to provide an improved system for measuring the magnitude and direction of forces exerted on a mass over a predetermined period of time while substantially reducing, if not eliminating, the problems of the above mentioned testing facilities utilizing piezoelectric load cells.

Another object of the present invention is to provide an improved system for measuring in three dimensions both forces and torques exerted on a mass.

And another object of the present invention is to provide an improved system for measuring the forces and torques exerted on a mass with respect to all six degrees of freedom.

Still another object of the present invention is to provide an improved system for measuring forces and torques applied to a mass, the system being less sensitive to mechanical vibrations and resonances induced in the system as a result of the applied forces and torques Yet another object of the present invention is to provide an improved testing system in which a mass is actively electromagnetically suspended in space so as to substantially isolate the mass when subjecting the mass to applied forces and torques.

And still another object of the present invention is to provide an improved system for measuring forces and torques applied to a mass over a predetermined time period, the system including electromagnetic bearings for isolating the mass during the application of the forces and torques.

And yet another object of the present invention is to provide a servo-controlled system for actively electromagnetically suspending a mass and measuring applied forces and torques to the mass within and above the bandwidth of the servo loop of the system.

These and other objects are achieved by a system for measuring a force applied to a mass so that the magnitude and direction of the force can be determined. The system comprises, in combination:

means for mounting the mass so that the mass is suspended in a predetermined position and orientation relative to a three-dimensional coordinate system defining three mutually perpendicular axes;

means for providing counter forces on the mass in response to forces applied to the mass so as to maintain the mass in the predetermined position and orientation;

means for measuring the force components of the forces applied to the mass in each of the directions of the three orthogonal axes; and means for determining the resultant force as a function of the force components.

Other objects will in part be obvious and will in part appear hereinafter. The invention accordingly comprises the apparatus possessing the construction, combination of elements, and arrangement of parts exemplified in the following detailed disclosure, and the scope of the application of which will be indicated in the claims.

For a fuller understanding of the nature and objects of the present invention, reference should be had to the following detailed description taken in connection with the accompanying drawings, wherein FIG. 1 is a side elevational view of the preferred system of the present invention;

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2;

FIG. 6 is a detailed cross-sectional radial view, partially cut away showing the axial bearing assembly at one end of the support assembly;

FIG. 7 is an axial cross-sectional view taken along line 7—7 of FIG. 6;

FIG. 8 is a cross-sectional view taken along line 8—8 of FIG. 2;

In the drawings, the same numerals are used to designate the same or similar parts.

Figure 1:
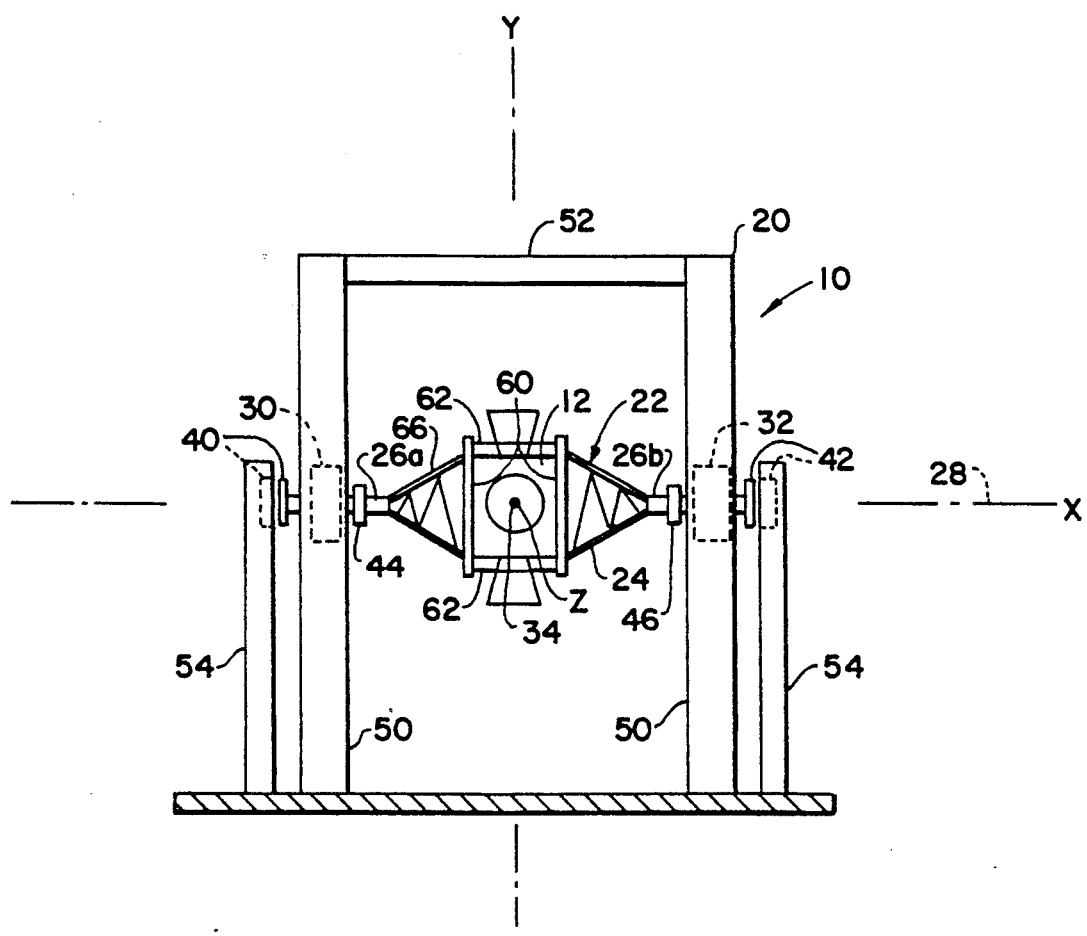

Referring to FIG. 1, the system 10 is preferably designed to suspend the mass 12 in space relative to a three-dimensional coordinate reference system, and to accurately measure vectored forces and torques applied to the mass during a predetermined test period. The preferred system measures the force and torque components over a relatively large dynamic range and frequency bandwidth with respect to all six degrees of freedom so that the magnitude and direction of the composite forces and torques can be then accurately determined.

Generally, the preferred system 10 includes a frame 20 for supporting the support assembly 22. The support assembly 22 includes mass support 24 and bearing shafts 26a and 26b secured at diametrically opposite sides of the mass support. The bearing shafts are co-axially aligned with one another and define the shaft axis 28. The bearing shafts 26a and 26b are supported in the frame 20 by identical radial electromagnetic bearing assemblies 30 and 32, respectively. The mass 12 is supported in a fixed position and orientation during the application of any forces and/or torques with respect to a three-dimensional coordinate reference system by assemblies 30 and 32, axial electromagnetic bearing assemblies 40 and 42, and rotary sensing means 44. The coordinate reference system is defined by the origin 34, where three mutually orthogonal axes, the X-, Y-and Z-axes, intersect. The origin 34 lies on shaft axis 28 (during static conditions) exactly midway between the two bearing assemblies 30 and 32 so that the X-axis is coaxial with axis 28 during static conditions. For purposes of illustration, the Y-axis extends through origin 34 in the vertical direction in FIG. 1, while the Z-axis extends through origin 34 normal to the plane of FIG. 1.

As will be more apparent hereinafter, in connection with the description of FIGS. 2-5, the radial bearing assemblies 30 and 32 include (a) means for actively magnetically suspending the mass with respect to the Y- and Z-axes during the testing period, and (b) means for sensing force components in both the Y-axis and Z-axis directions, at two spaced apart locations along the X-axis so that these components can be used for determining (i) the corresponding vectored components of the actual forces applied to the mass in the directions of the Y- and Z-axes, and (ii) the torque components creating yaw and pitch rotations of the mass about the Y- and Z-axes.

Figure 2:
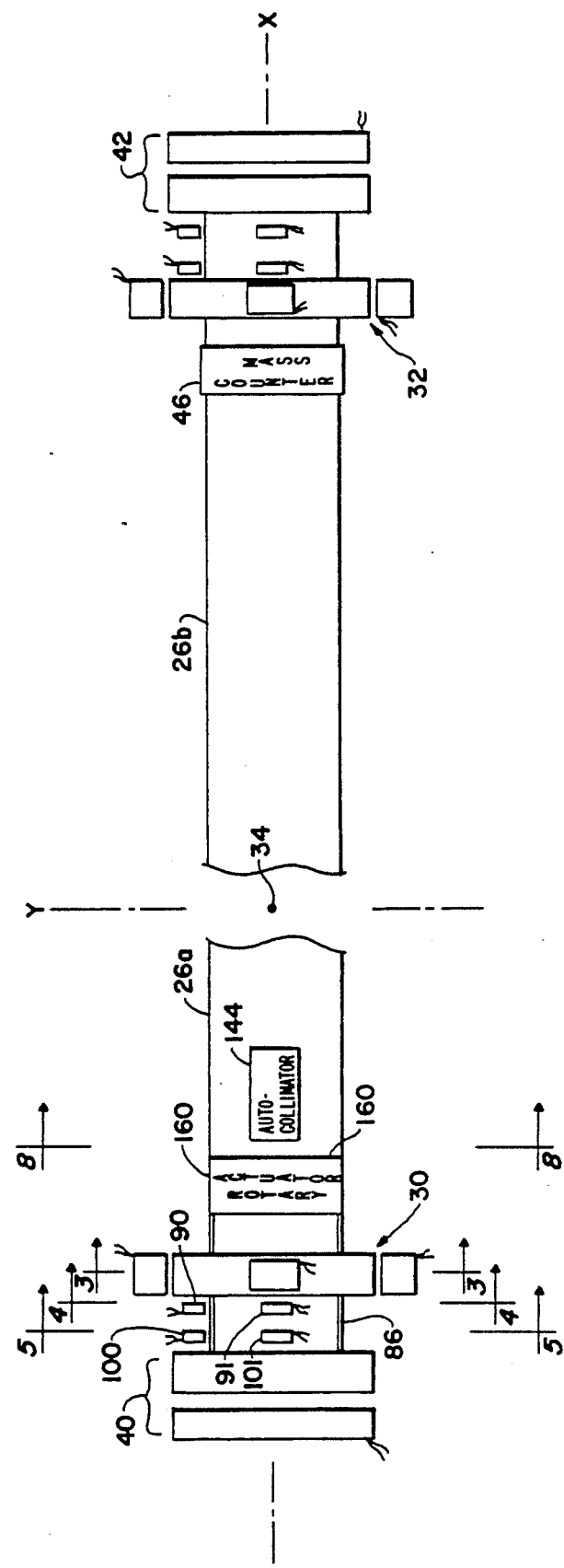
FIG. 2 is a detailed side elevation view, partially cut away, of the bearing and sensor assemblies used to suspend the support assembly and mass and to measure various force and torque components.

As described in greater detail in FIGS. 2, 6 and 7 axial electromagnetic bearing assemblies 40 and 42 are positioned at opposite ends of the shafts 26a and 26b, respectively. Assemblies 40 and 42 include means for actively magnetically suspending the mass so that it remains substantially fixed with respect to the X-axis. Preferably, each axial bearing assembly (one being shown in detail in FIGS. 6 and 7) also includes means for sensing any force components coaxial with the X-axis. The axial force components along the X-axis can then be used with the two other vectored force components in the Y-axis and Z-axis directions to determine the magnitude and direction of the resulting composite vectored force acting on the mass.

Finally, as best shown in FIGS. 2 and 8, the system preferably includes rotation sensing means 44 for sensing rotation of the support assembly 22 and mass 12 about the X-axis relative to a predetermined reference orientation. As shown in FIG. 2, the sensing means 44 is provided preferably on only one of the shafts 26a. A counter mass 46 is also preferably provided on the other shaft 26b to offset the effects of the mass of the sensing means 44 has on the electromagnetic radial bearing assemblies 30 and 32, as will be more apparent hereinafter. As will be seen hereinafter, the rotation sensed by the rotation sensing means 44, as well as means for sensing angular acceleration illustrated in FIG. 5, can be utilized to determine the torque on mass 12 associated with roll of the mass about the X-axis.

Describing the system in greater detail, referring to FIG. 1, the support frame 20 can be constructed in any known manner so as to provide a stable and rigid support for the entire structure including the mass 12 during the application of the maximum expected forces and torques. Frame 20 includes vertically directed sections 50 for respectively supporting the electromagnetic radial bearings 30 and 32 so that the axes of the shafts 26a and 26b (axis 28) will be coaxial with the X-axis when there are no forces applied to the mass 12 (other than gravity). A horizontal section 52 provides structural stability. Two additional vertical frame sections 54, for supporting the stationary portions of the corresponding axial bearing assemblies 40 and 42 relative to the X-axis, are provided, spaced from the vertically directed sections 50, respectively opposing the remote ends of the shafts 26a and 26b.

The support assembly 22, shown in FIG. 1, includes suitable structure for supporting mass 12. The structure for supporting the mass should be sufficient to allow the mass to be easily inserted and removed from the assembly For example, the assembly can include a pair of plates 60 having four bolts (two being shown at 62 in FIG. 1) respectively securing the four corners of each plate to each other so that the mass can be secured between the plates 60 by tightening all of the bolts. Truss sections 66 secure the shafts 26a and 26b to the respective plates 60 so that the shafts are rigidly fixed with respect to one another and to the plates.

The radial electromagnetic bearing assemblies 30 and 32 are positioned at spaced apart locations along the X-axis as shown in FIG. 2, and are identical in structure. As shown in FIG. 3, each assembly 30 and 32 includes an outer housing 70 secured to the respective vertically directed section 50 of the frame 22 by any suitable means such as bolts 72 so as to be fixed relative to the X-axis. The housing supports four pole piece assemblies 74 and 75 symmetrically and equi-angularly fixed in position, around and equally radially spaced from the X-axis (such that the position of the pole piece assemblies of the bearing assemblies 30 and 32 define the X-axis). The pole piece assemblies are thus shown 90° apart, disposed in a Y'Z' plane parallel to the YZ plane, with two of the pole piece assemblies 74 being positioned along a vertical axis Y' in FIG. 3, parallel to the Y-axis, while two of the pole piece assemblies 75 are positioned along a horizontal axis Z' in FIG. 3, parallel to the Z-axis. The four pole piece assemblies 74 and 75 of each radial bearing assembly 30 and 32 are secured in place on the housing 60 in any well known manner so as to form an "electromagnetic journal" for the respective shaft 26 (as will become more evident hereinafter).

Each pole piece assembly 74 and 75 includes a pole piece 76 comprising a magnetically conductive material such as soft iron or vanadium permandur. Each pole piece is formed so that its radial cross-section (as seen in FIG. 3) is U-shaped so as to form radially directed segments 78 of equal size extending from opposite ends of the middle segment 80 of the pole piece. The radially directed segments 78 of each pole piece 76 are wound with a coil assembly 82 or 83 for providing current around the circumference of each of the radially directed segments. The current, in turn, produces a magnetic field through the pole piece, as represented by arrows 84. As will be more evident hereinafter, the radial cross-section of the pole piece and the number of windings of the coil around the radial segments 78 are such that the flux produced through the ends of the radial segments of each pole piece will produce a resulting electromagnetic force (EMF) coaxial with the corresponding Y'-axis or Z'-axis The coil assemblies 83, each preferably include two coils and are coupled together and disposed along the vertical Y'-axis, while each of the coil assemblies 82 each include a single coil and are coupled together and disposed along the horizontal Z'-axis.

As will be more evident hereinafter, one of the coils of each Y'-axis coil assembly 83 is adapted to carry a predetermined DC current for providing a constant vertical EMF on the shafts 26a and 26b equal and opposite to the force of gravity on the total mass suspended by the radial bearing assemblies (which includes the mass of the shafts 26a and 26b, the truss sections 66, plates 60 and the mass 12). The remaining coil of each assembly 83 and the coil of each assembly 82 carry current as a function of electromagnetic forces that are to be created and applied to the shafts 26a and 26b at any one instant of time. As described in greater detail, the magnitude of the flux is dependent, at least in part, upon the amount of current flowing through the coil assemblies 82 and 83 of each pole piece assembly.

Disposed within the pole piece assemblies 74 and 75 of each radial bearing assembly 30 and 32 is the corresponding shaft 26a and 26b, respectively. In order to magnetically couple the shafts to the corresponding pole piece assemblies, each shaft preferably includes a collar 86 secured to the shaft within the corresponding radial bearing assembly so as to be axially positioned between the pole piece assemblies 74 and 75. Each collar is made of a material magnetically conductive to the flux indicated by arrows 84, such as soft iron or vanadium permandur, so that the collar is magnetically attracted by the electromagnetic forces created by each of the adjacent pole piece assemblies 74 and 75 in a direction depending upon the magnitude and direction of the variable current through the coil assembly. As is well known, the force created by each pole piece assembly on the corresponding collar is as follows:

$$F = k_a B^2 = k_b I^2/g^2; \quad (1)$$

wherein F is the force (Newtons);

$k_a$ is equal to $AK_1/\mu_o$, a proportional constant and a function of A (the cross-sectional area of the gap in meters between collar 86 and radially directed segments 78), $K_1$ (the magnetic leakage factor) and $\mu_o$ (the permeability of free space);

B is the magnetic flux density set up by the pole piece assemblies through each of the radial segments 68 in response to and as a function of the input current (teslas);

g is the gap between the end of each radial segment and the outer surface of the collar 86 (meters); and $k_b$ is equal to $N^2\mu_o AK_1/4$, a proportional constant and a function of A (the cross-sectional area of the gap between collar 86 and radially directed segments 78), $K_1$ (the magnetic leakage factor), $\mu_o$ (the permeability of free space), and N (the number of turns of the coil assembly); and I is the current applied to the coil assembly (amps).

The radial bearing assemblies 30 and 32 each include (1) means for sensing the level of the variable current in each of the coil assemblies 82 and 83, and (2) means for sensing any radial displacement of the respective shaft 26 (i.e., axis 28) from the reference X-axis in each of the directions of the Y'-axis and Z'-axis at the axial location of each radial bearing assembly By knowing these two parameters, Equation (1) can be used to determine the level of force being applied at any given time by the electromagnet.

Preferably, the variable current applied to each coil assembly is sensed in a well known manner by measuring the voltage across a resistor (not shown) placed in series with the corresponding coil assembly. The current is found through Kirchhoff's Law (I=V/R, wherein I=current, V=voltage and R=resistance).

In FIG. 4, the means for sensing the radial displacement of the respective shaft 26 preferably includes two pairs of sensors 90 and 91 placed respectively 90° apart, along the Y'-axis and Z'-axis, at or near the position of each bearing assembly along the X-axis, and radially fixed at equal distances from the X-axis, so that any radial displacement of the shaft axis 28 relative to the X-axis will be detected. As will be more evident from FIG. 9, the pair of outputs of the opposing proximity sensors 90, disposed along the Y' axis, are connected to the input of a differential amplifier 170, and the outputs of the pair of proximity sensors 91, disposed along the Z'-axis, are connected to the input of another differential amplifier 170 for increasing the accuracy of the sensors. Although the type of sensor used for each of the sensors 90 and 91 may vary, the devices are preferably differential impedance transformer proximity sensors manufactured by the Kaman Corporation of Boulder, Col., under the designation KD 4300-20N-DIT, because of the extreme accuracy of these devices in measuring relative displacement. The latter sense relative displacement of the axis 28 of the shaft 26 relative to the X-axis by sensing changes in eddy currents that exist between the sensor tip and the collar 86 over a range of $+/-0.018$ inches, with a coarse resolution of 2 micro-inches at 10 kHz at relatively high force levels. Alternatively, other types of sensors can be used, such as linear voltage differential transducers (LVDTs), depending upon the accuracy of measurement required for the particular application.

For reasons which will be evident hereinafter, means are also provided for measuring any relative linear acceleration in the radial direction of each shaft 26 along each of the Y'-axis and Z'-axis in the vicinity of each of the radial bearing assemblies 30 and 32. As is well known, forces can be measured by measuring acceleration because of the well known relationship between force and acceleration as expressed by Newton's Second Law:

$$F = ma \tag{2}$$

wherein F is the force (Newtons);
m is the accelerated mass (kilograms); and
a is the acceleration (m/sec$^2$)

Preferably, the linear acceleration of the shaft is sensed in each of the Y'-axis or Z'-axis directions for each radial bearing assembly. The means for sensing these linear acceleration components include two accelerometers indicated at 100 and 101 in FIG. 5, and positioned (1) so as to be fixed on the shaft 26 (preferably on the outer surface as shown) at or near the position of the corresponding radial bearing assembly along the X-axis, with the direction of sensitivity of accelerometer 100 being directed along the Y'-axis and the direction of sensitivity of accelerometer 101 being directed along the Z'-axis. The means for sensing each linear acceleration component can be any commercially available type. Preferably, the accelerometers are each of the piezoelectric sheer type, such as those designated as model 7251-100 and sold by the Endevco Corp. of San Juan Capistrano, Calif., the latter being extremely accurate, having a resolution of 300 micro-g's at 5 kHz so as to provide the necessary acceleration resolution, as will be more apparent hereinafter.

The axial electromagnetic bearing assemblies 40 and 42 are positioned at opposite ends of the shafts 26a and 26b, respectively, and are designed to maintain the shafts 26, truss segments 66, plates 60 and mass 12 fixed along the axis 28, and to sense any forces directed along the X-axis. More specifically, as shown in detail in FIGS. 6 and 7, each axial bearing assembly includes a thrust plate 110 made of an electromagnetically conductive material, such as soft iron or vanadium permandur, and positioned on the remote end of each of the shafts 26. Each thrust plate 110 is preferably made so that it is shaped with a substantially uniform thickness and its mass is substantially evenly distributed around the axis 28. Each axial bearing assembly also includes a stationary core member 112 positioned in a respective vertical frame section 48, opposite and axially spaced from a corresponding thrust plate 110 at the end of the corresponding shaft 26. Each core member is preferably shaped in the form of a cylindrical disk and is secured in the respective frame section 54 so that the cylindrical axes of the core members are coaxial with one another and the X-axis. Each core member is provided with a cylindrical slot 114, coaxial with the X-axis for receiving the respective coil assembly 116. The coil assemblies 116 are coupled together, with the direction and the number of turns of each coil assembly 116 being such that each core member 112 and associated coil assembly 116 will induce an EMF on the respective thrust plate 110 (and thus the mass provided by the thrust plates 110, shafts 26, truss segments 66, plates 60 and mass 12) in response to a given current. The force provided is a function of the flux produced by the magnetic field (shown by arrows 118) and a function of the current generated through the coil assembly in accordance with equation (1), mentioned above. The core members, coil assemblies, and thrust plates 110 of assemblies 40 and 42 are substantially identical so that the force-current relationship of the two assemblies are identical.

The means for sensing the force components along the X-axis preferably includes means for sensing the current through coil assemblies 116 and means for sensing the relative displacement of each thrust plate along axis 28 relative to a corresponding predetermined position. Each of the axial bearing assemblies (as shown in FIGS. 6 and 7) preferably includes means for sensing the force components coaxial with the X-axis in accordance with Equation (1), above. Current is sensed by measuring the voltage across a resistor (not shown) placed in series with the corresponding coil assembly 116. The means for sensing the relative displacement of each thrust plate relative to each core member preferably includes a proximity sensor 120 positioned in the center of the core member, coaxial with the X-axis for measuring the relative distance between the core member and the thrust plate. Each proximity sensor 120 is preferably of the type described above with respect to the sensors 100 and 101, with the pair of sensors being connected as a differential pair in a similar manner to each pair of sensors 90 and each pair of sensors 91, as described hereinafter with respect to FIG. 9, in order to provide greater accuracy.

In addition, for reasons which will be evident hereinafter, means are also provided for measuring any relative acceleration in the axial direction of the shafts 26, in the direction of the X-axis. Preferably, the means for measuring the acceleration components in the X-axis direction includes an accelerometer 130 positioned as shown in FIG. 6 so as to be fixed relative to the thrust plate 110 so that the direction of sensitivity is along or parallel to the X-axis. The accelerometer is preferably of the same type described above with respect to the accelerometers 100 and 101.

The rotation sensing means 44 for sensing rotation of the support assembly 22 and mass 12 about the reference axis 28, relative to a predetermined referenced angular orientation, is shown in greater detail in FIG. 8. The sensing means is preferably an autocollimator assembly 140, a portion of which is provided on the shaft 26a. Specifically, an autocollimator 144, radially spaced from the shaft, is oriented so as to project a collimated beam 142, preferably in a radial direction toward the shaft 26a. A retro-reflector 146 is fixed on the outer surface of the shaft 26a so that the beam 142 is reflected back to and detected by the autocollimator 144. The autocollimator 144 is thus adapted to sense any rotational movement of the shaft 26a about the axis 28 relative to a predetermined referenced angular orientation or null position.

The autocollimator assembly 140 may be any type of commercially available device, such as the model 1010 or 1020 (depending upon the size of the anticipated forces to be measured) manufactured by the United Detector Technology of Hawthorne, Calif. The model 1010 provides 100 micro-radian resolution over a 0.1 radian (5.7 degrees) range, while the model 1020 provides a 4 micro-radian resolution over a 1.44 milliradian (0.08 degree) range. Should environmental contamination occur during operations of the system, the autocollimator assembly 140 and its optics are enclosed in a protective shield (not shown). The autocollimator system is particularly useful for a relatively small range of angular readouts.

Again, for reasons which will be evident hereinafter, the rotation sensing means 44 also includes means for measuring any relative angular acceleration about the axis 28 of the shafts 26. Preferably, as shown in FIG. 5, the means for measuring the angular acceleration component about the X-axis includes an "off-axis" accelerometer indicated at 150 and positioned so as to be fixed relative to the shaft 26 (positioned inside the shaft 26 near the axis 28). The accelerometer is positioned with the accelerometer 100 in the same radial plane passing through the shaft 26, normal to the axis 28. The direction of sensitivity of the accelerometers 100 and 150 are oriented along parallel lines such that the direction of sensitivity of accelerometer 100 extends through the axis 28, in the Y'-axis direction, while the direction of sensitivity of accelerometer 150 extends along a line spaced from the axis 28, as shown. As will be evident hereinafter, the angular acceleration of the shaft about the axis 28 is a function of the difference between the output of the accelerometer 150 and that of the accelerometer 100 (to subtract out the linear acceleration component in the Y'-axis direction). Specifically, the angular acceleration is defined in accordance with the following relationship:

$$\omega = (A_{150} - A_{100})/r \qquad (3)$$

wherein "$\omega$" is the angular acceleration (rad/sec$^2$)

$A_{150}$ is the measured acceleration by the accelerometer 150 (m/sec$^2$);

$A_{100}$ is the measured acceleration by the accelerometer 100 (m/sec$^2$); and r is the radial distance from the axis 28 to the accelerometer 150 (m).

The off-axis accelerometer 150 is preferably of the same type described above with respect to the accelerometers 100 and 101.

As described in greater detail hereinafter, the rotation sensing means 44 is used to control the rotary actuator assembly 160, as shown in FIG. 2. As will be more evident hereinafter, the angular movement of the shaft about the axis 28, i.e., the roll, is a function of the amount of rotation sensed by the autocollimator assembly 140. Assembly 160 preferably is the model RA 55-22-001 manufactured by BEI Motion Systems of San Marcos, Calif. because the latter provides relatively large torque outputs and fast response times (the device is capable of providing 400 oz-in of torque), although other devices can be employed depending on the application. In general, as described in greater detail hereinafter the torque applied to the shaft by the rotary actuator assembly 160 is proportional to its input current as indicated by the following general equation:

$$T = kI; \qquad (4)$$

wherein T is the torque applied to the shaft about the axis 28 (m-kgms);

k is a proportional constant of the actuator assembly; and

I is the input current to the actuator assembly (amps). In the preferred embodiment the autocollimator 144 of assembly 140 provides an output current proportional to the portion of the collimated beam reflected by and received from the retro-reflector 146 so as to provide a current to the rotary actuator assembly 160. The assembly 160 applies a torque component on the shaft 26 proportional to this current as indicated by the following equation so as to return the direction of the beam toward the retro-reflector:

$$T_a = kI_a; \qquad (5)$$

wherein $T_a$ is the torque applied to the shaft about the X-axis as a result of the sensed movement by the autocollimator;

$I_a$ is the current provided by the autocollimator 144; and k is a proportional constant of the actuator assembly. As will be more evident hereinafter, the angular acceleration defined by equation (4) above, is used to provide additional torque about the X-axis. Specifically, the torque associated with the angular acceleration is determined in accordance with the following equation:

$$T_b = (mr^2)\omega = k_b\omega \qquad (6)$$

wherein $T_b$ is the torque applied to the shaft about the X-axis as a function of angular acceleration (m-kgms);

m is the mass moved about the axis 28 by the actuator assembly 160 (kgms);

r is the radial distance between the axis 28 and the actuator assembly 160 (m);

$\omega$ is the angular acceleration determined by equation (3) (rads/sec$^2$); and $k_b$ is a proportional constant of the actuator assembly as a function of m and r.

In order to suspend the mass 12 so that it remains substantially fixed relative to the X, Y and Z axes during a testing period, a servo control system 168 is provided for controlling the position of the mass relative to the radial bearing assemblies 30 and 32, the axial bearing assemblies 40 and 42 and the autocollimator assembly 140. The system 168 is preferably of an active suspension system type which utilizes electromagnetic forces to maintain the mass substantially stationary relative to the X-, Y- and Z-axes when the mass is subjected to externally applied torques and forces (at least with respect to forces and torques below a predetermined frequency band which defines the bandwidth of the control system, as will be more evident hereinafter).

Figure 9:
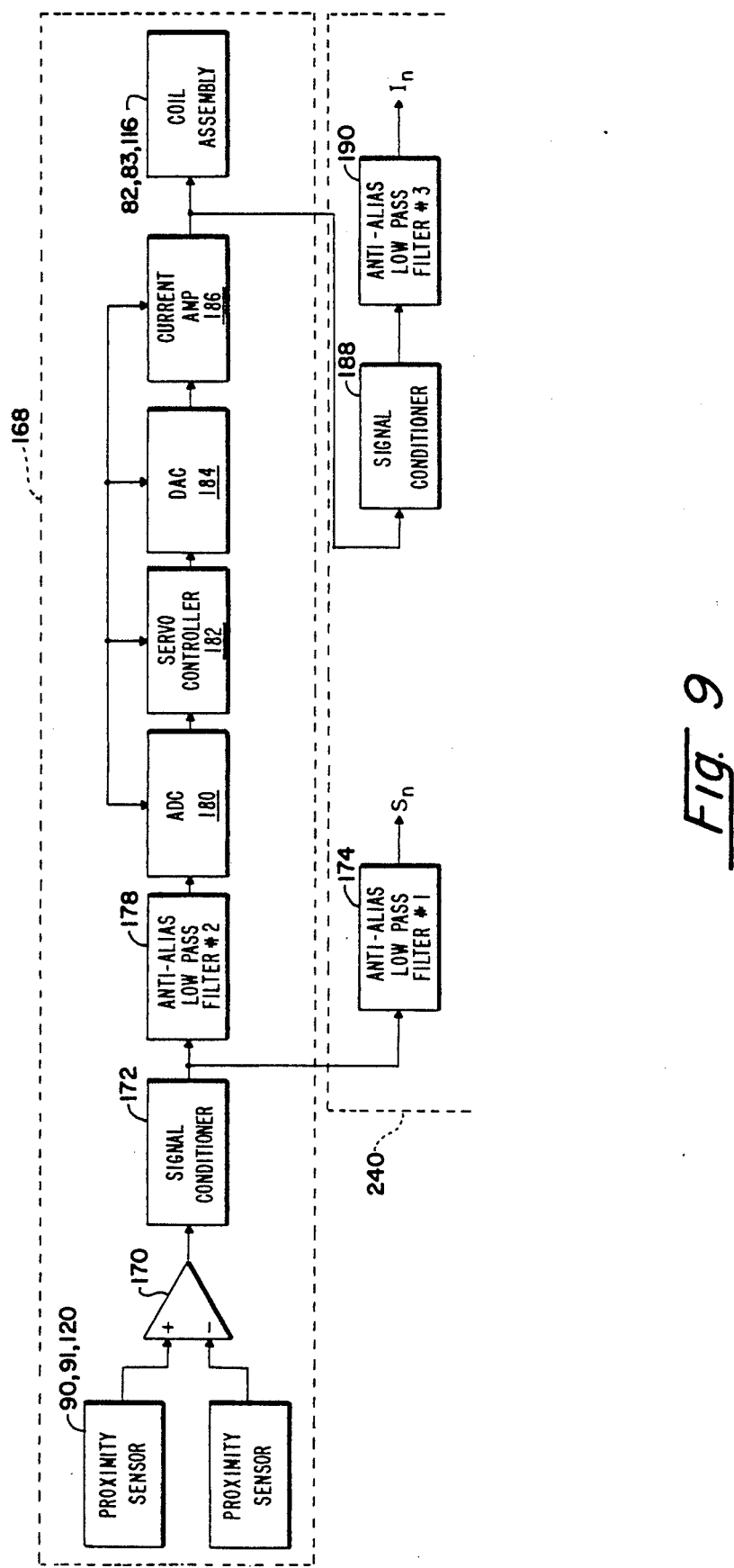
FIGS. 9 and 11 are block diagrams of the servo control system for maintaining the mass in a predetermined suspended position as well as a portion of the data acquisition system.

More specifically, referring to FIG. 9, servo control system 168 is used with each pair of proximity sensors 90 and with each pair of proximity sensors 91 of each of the radial bearing assemblies 30 and 32, and with the pair of proximity sensors 120 of the axial bearing assemblies 40. Thus, five identical servo control systems are used with the ten respective proximity sensors. As shown in FIG. 9, the output of each proximity sensor representative of the gap between the collar 86 and the respective pole piece 76 (in the case of sensors 90 and 91), or the gap between the thrust plate 110 and the core member 112 (in the case of sensor 120), is applied to an input of a differential amplifier 170. The output of the sensors are connected so that the signal from one of the sensors of each pair is subtracted from the signal from the other of the sensors of the pair. As is well known the difference output is a more accurate measurement than using only one sensor output to detect a change of gap. The outputs of the sensors of each pair are calibrated so that the output of the amplifier 170 will be zero when the detected gaps are at the preset reference value to which a change of gap is measured. The output, representative of the relative movement from the preselected value, is applied to analog signal conditioner 172, such as a pre-amplifier. The output of the signal conditioner 172 is applied to the input of an anti-aliasing low pass filter 174 of the data acquisition system 240, described in greater detail hereinafter.

Signal conditioner 172 is also connected to a second anti-aliasing low pass filter 178, which in the preferred embodiment is provided with a low pass cutoff of 2kHz. The output of filter 178, in contrast to the output of filter 174, is use to provide data for use in magnetically suspending and controlling the position of the mass 12. The output of filter 178 is connected to the input of an ADC 180. The latter samples its input signal at a predetermined sampling rate of at least 2kHz. The output of the ADC 180 (indicated as $s_p$) is preferably a 12 bit digital output signal and is applied to the input of the servo controller 182. The latter is a modified PID controller including a dedicated microprocessor chip for calculating the current in response to the sensed measurement provided from the corresponding proximity sensor. The system is initially calibrated so that the servo controller includes the value of the signal (preferably zero) from the pair of proximity sensors when the shaft is correctly positioned in the null position (in the absence of any external forces except those relating to gravity so that the shaft axis 28 is aligned with and correctly positioned along the X-axis at the predetermined rest position). Each controller also includes a look up table to correlate the signal level received from the respective proximity sensor with a value of current corresponding to the required EMF to return the shaft to its null position, consistent with equation (1) above. The output of the controller 182 thus is a digital signal (preferably a 12 bit signal) representative of the value of the current I of equation (1) above. The output of the controller is also applied to the input of a digital-to-analog converter (DAC) 184 adapted to convert the 12 bit digital signal to an analog signal. The output of the DAC 184 is applied to a current amplifier 186 so as to provide the value I to the corresponding coil assembly 82, 83 or 116. The polarity of the current will determine which direction the EMF is to be applied, while the magnitude will determine the magnitude of the EMF to be applied. Thus, the output current applied to the coil assembly is used to magnetically suspend and control the position of the mass 12 with respect to the X-, Y- and Z-axes.

Each controller 182 for each bearing assembly is connected to control the ADC 180, DAC 184, and current amplifier 186 so that the microprocessor controls the operation of these components. The microprocessor of each controller 182 is programmed, as indicated by the flow chart of FIG. 10, and described in greater detail hereinafter, so as to maintain the mass in a stable position relative to the X-, Y- and Z-axes during the testing period.

Figure 11:
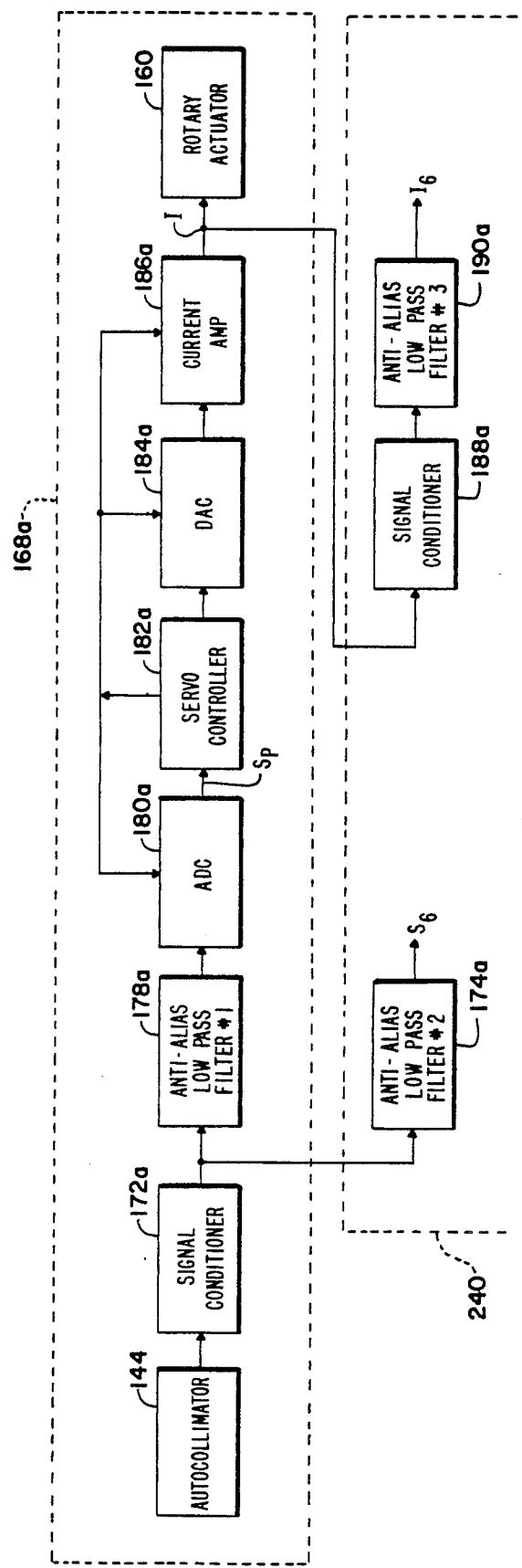

In a similar manner a servo control system 168a for controlling the rotary actuator assembly 160 is shown in block form in FIG. 11. The servo control system 168a is used with the autocollimator 144. The output of the autocollimator 144, representative of the angular displacement of the shaft from a null position, is processed in the same manner as the difference signal outputs of differential amplifiers 170, except that the microprocessor of the controller 182a is programmed to determine the torque from the value of the current signal received from the autocollimator. Thus, the output from the autocollimator 144 is applied to an analog signal conditioner 172a. The output of the signal conditioner 172a is applied to the input of an anti-aliasing low pass filter 174a of the data acquisition system 240 described in greater detail hereinafter.

Signal conditioner 172a is also connected to a second anti-aliasing low pass filter 178a of the servo control system 168a. In the preferred embodiment, filter is provided with a low pass frequency cutoff of 2kHz. The output of filter 178a is connected to the input of an ADC 180a. The latter samples its input signal at a predetermined sampling rate of at least 2kHz. The digital output of ADC 180a is preferably a 12 bit digital signal and is applied to the input of the servo controller 182a. The latter is also a modified PID controller including a dedicated microprocessor chip for calculating the torque in response to the sensed measurement provided from the autocollimator 144 to restore the mass to the null position about the X-axis. The system is initially calibrated so that the servo controller includes the value of the signal generated from the autocollimator when the shaft is positioned at the null position (in the absence of any external torques) so that the retro-reflector 146 is properly oriented with respect to the autocollimator 144. The controller includes a look up table to correlate the signal level received from the autocollimator with a value of current corresponding to the required torque to return the shaft to the null position, consistent with equation (3).

The output of the controller 182a thus is a digital signal (preferably a 12 bit signal) representative of the value of the current I. The output of the controller is applied to the input of a DAC 184a. The latter output is applied to a current amplifier 186a so as to provide the value I to the rotary actuator assembly 160. The value of current I is used in the data acquisition system, described in greater detail hereinafter.

The controller 182a is connected to control the ADC 180a, DAC 184a and the current amplifier 186a so that the microprocessor controls the operation of these components. The microprocessor of controller 182a is programmed, as indicated by the flow chart of FIG. 12, and described in greater detail hereinafter, so as to maintain the mass in a stable orientation about the X-axis during the testing period.

In operation, the system 10 is calibrated so as to determine, inter alia, the null positions of the various parts along the three axes in order to provide the value of "g" (the gap between the pole pieces 76 and the collar 86, and between the thrust plates 110 and the core members 112) at the null position during static conditions. These values are entered into the microprocessor 186. The system 10 is also calibrated so as to determine the null orientation of the shaft about the X-axis during static conditions. This position should be when the retro-reflector 146 provides a maximum amount of reflected energy back to the autocollimator 144. This value is entered into the microprocessor 182a.

Once calibrated, the six controllers will maintain the mass 12 at a relatively stable position in the X-, Y- and Z-axes directions at the null positions during the application of forces and torques below the 2kHz cutoff, as well as a relatively stable orientation about the X-axis during the initial static conditions.

Figure 10:
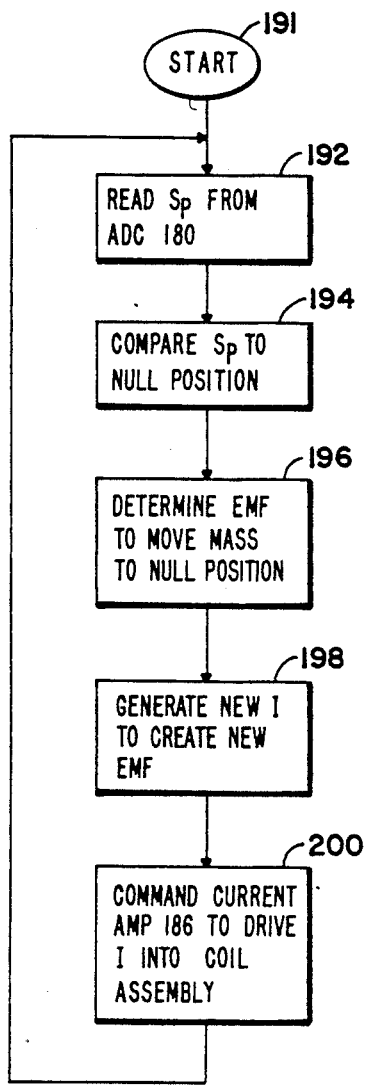
FIGS. 10 and 12 are flow charts illustrating the operation of the servo controllers shown in FIGS. 9 and 11, respectively.

Referring to FIG. 10, the operation of servo control system 168 will now be described, wherein the servo control would start at step 191. The value of the output of ADC 180 is read by the servo controller 182 for each sampling period as shown at step 192. The value of the signal will represent the present magnetic gap between the two components that are being controlled. At step 194, the value of the signal is compared to the value of the signal for the gap when the components are in the relative null position. If the values are different, the value of the new current required to be applied to the corresponding coil assembly to provide the EMF to move the components back to the null position is determined at step 196, i.e., by using the look up table. After determining the force, the appropriate current is provided to the current amplifier 186 at step 198 and at step 200 the current amplifier is commanded to drive the coil assembly. The controller then repeats steps 192-200 and continues repeating the sequence until system operation is terminated.

Figure 12:
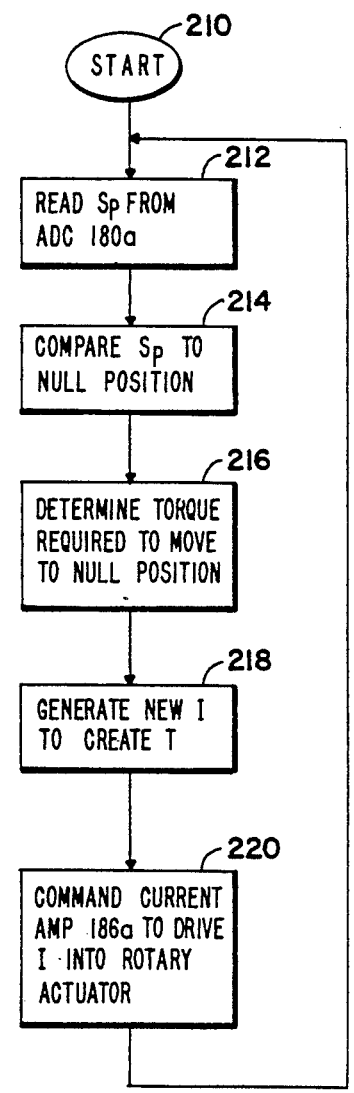

The microprocessor of the controller 182a is programmed as indicated by the flow chart of FIG. 12 so as to maintain the mass in a null orientation about the X-axis during the testing period. In operation servo control would start at step 210. The value of the output of ADC 180a is read by the servo controller 182a for each sampling period as shown at step 212. The value of the signal will represent the angular position of the retro-reflector about the X-axis relative to the null orientation. At step 214, the value of the signal is compared to the value of the signal for the null orientation. If the values are different, the microprocessor determines, at step 216, the value of the new current required to be applied to the rotary actuator assembly 160 to provide the torque to move the mass back to the null position, e.g., by using a look up table. After determining the torque, the appropriate current is provided to the current amplifier 186a at step 218, and at step 220 the current amplifier is commanded to drive the rotary actuator assembly 160. The controller then repeats steps 212-220 and continues repeating the sequence until the system operation is terminated.

For purposes of gathering data, the data acquisition system 240 will now be described. Referring to FIG. 9, the output of the signal conditioner 172 is applied to the input of an anti-aliasing low pass filter 174 of the data acquisition system 240. In the preferred embodiment the filter is provided with a low pass cutoff of 5kHz, well above to 2kHz cutoff of the servo controller 168. The output of filter 174 is an analog signal $s_n$, wherein n is the number of the pair of proximity sensors as identified in TABLE I, below As will be more evident hereinafter, the output of the filter 174 provides some of the data for the force and torque measurements.

In a similar manner, as shown in FIG. 11, the output of the signal conditioner 172a is applied to the input of an anti-aliasing low pass filter 174a of the data acquisition system 240. In the preferred embodiment, filter 174a is also provided with a low pass frequency cutoff of 5kHz. The output of filter 174a is the position signal $s_6$, as indicated in TABLE I below representative of the data relating to the orientation of the mass about the X-axis with respect to a predetermined reference orientation.

As described above, the current applied to each coil assembly 82, 83 and 116 in FIGS. 9 and 11 is also sensed for purposes of determining the data values of the forces and torques applied to the mass during the testing period. As previously mentioned, the value of the current applied to each coil assembly is preferably measured by measuring the voltage across a resistor (not shown) placed in series with the corresponding coil assembly In order to generate data signals representative of the values of the current applied to each coil assembly at the appropriate sampling rate for the data acquisition system described hereinafter with respect to FIG. 14, the sensed signal representative of the current applied to the coil assembly is processed to provide a data signal for the data acquisition system. Accordingly, as shown in FIG. 9, the signal representative of the current in the coil assembly is applied to signal conditioner 188. The output of the latter is applied to the low pass anti-aliasing filter 190, having the same cut-off frequency as the filter 174, preferably 5kHz. The output of filter 190 is an analog signal, $I_n$, the value n corresponding to the component part as indicated in TABLE I below.

In the same manner, as shown in FIG. 11, the value of the current I applied to the rotary actuator assembly 160 is sensed through a resistor (not shown) connected to the rotary actuator assembly 160 and is applied to the signal conditioner 188a, which in turn is connected to the filter 190a, identical to filter 190. The output of filter 190a is the signal $I_6$ as identified in TABLE I below.

Accelerometers 100, 101, 130 and 150 are utilized to sense the relevant acceleration data which relates to dynamic forces which cause motion of the mass 12 that are not compensated by the magnetic suspension servo control systems 168 and 168a. The dynamic forces will be present at frequencies above the bandwidth of the servo control systems 168 and 168a, which as mentioned above has a preferred 2kHz cutoff.

Figure 13:
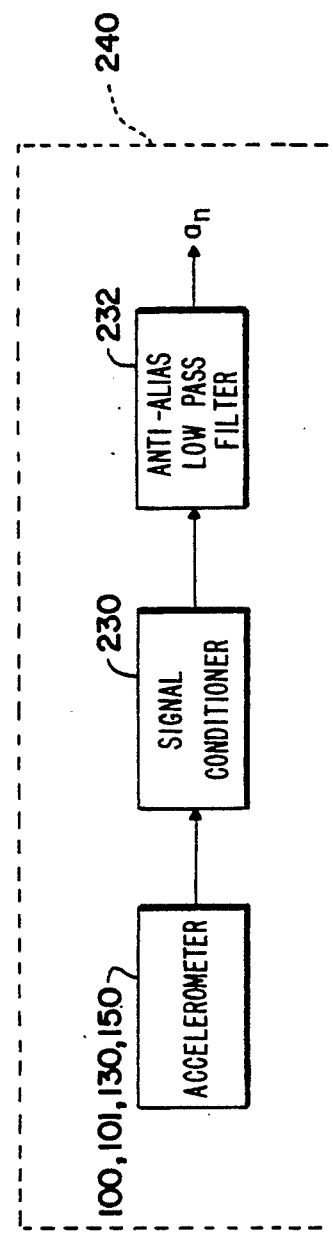
FIG. 13 is a block diagram of the system for generating an acceleration data input signal for the data acquisition system.

As shown in FIG. 13 each accelerometer 100, 101, 130 and 150 of the system 10 forms part of the data acquisition system 240 and has its output connected to an analog signal conditioner 230 (identical to conditioners 172 and 172a), which in turn is connected to a third anti-aliasing low pass filter 232 (identical to filters 174 and 174a). Filter 232, therefore, has a low pass cutoff of 5kHz (well above the 2kHz of the servo control systems 168 and 168a) and is controlled by the data processor 254 of FIG. 14. The output of the filter 232 is the analog signal an representative of the acceleration sensed in the direction of sensitivity of the device, with n representing the consecutive numbers one to six for the corresponding accelerometers 100 and 101 of the radial bearing assemblies 30 and 32, and accelerometers 130 and 150 as indicated in TABLE I below.

Figure 14:
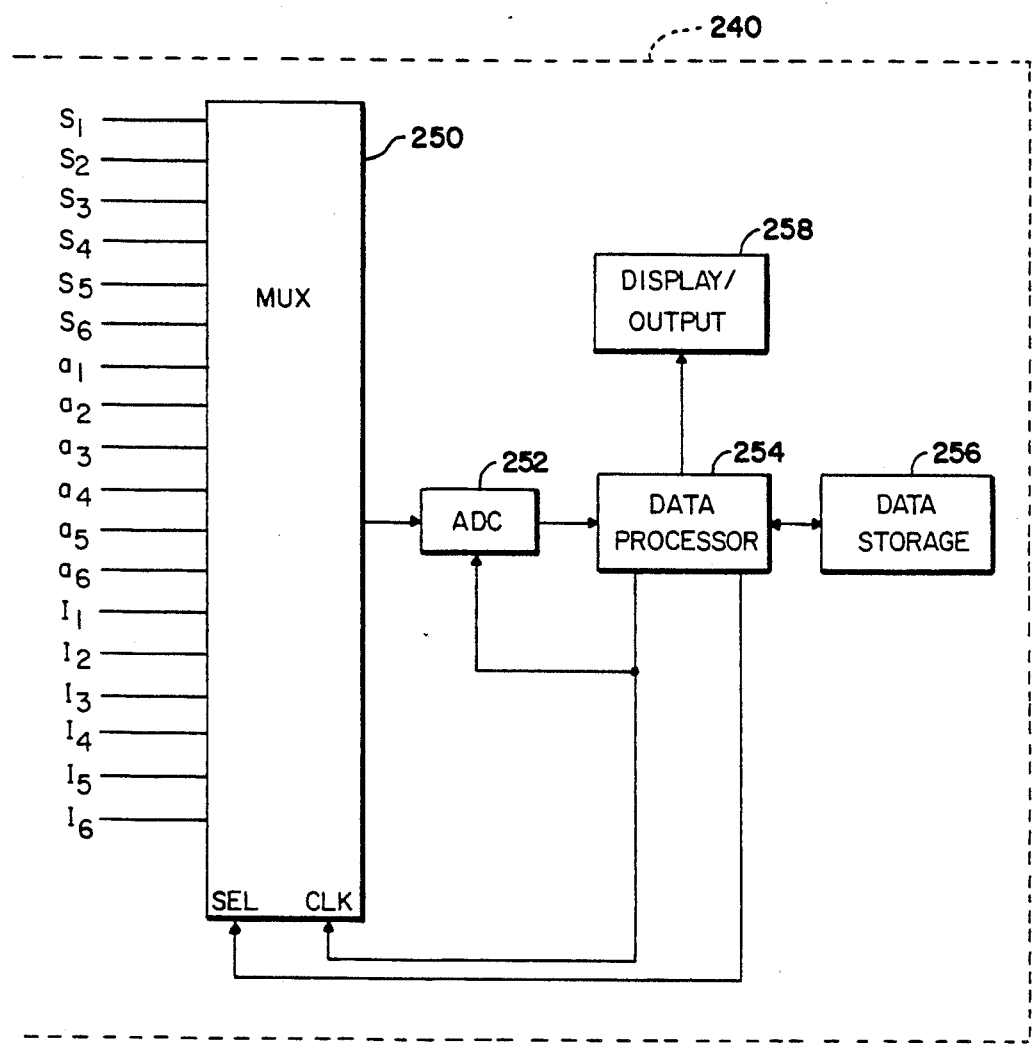
FIG. 14 is a block diagram of the data processing system used for acquiring and processing the data contained in the generated signals indicated in FIGS. 9, 11 and 13.

The remaining portion of the data acquisition system for acquiring the data represented by the signal $s_1$-$s_6$, $a_1$-$a_6$ and $I_1$-$I_6$ during the testing period is shown in FIG. 14. For convenience the signals $s_n$, $a_n$ and $I_n$ are from the corresponding parts indicated:

TABLE 1

| Signal | Component | Direction |
|---|---|---|
| $s_1$ | dif out of snrs. 90 of ass. 30 | (Y-axis) |
| $s_2$ | dif out of snrs. 91 of ass. 30 | (Z-axis) |
| $s_3$ | dif out of snrs. 90 of ass. 32 | (Y-axis) |
| $s_4$ | dif out of snrs. 91 of ass. 32 | (Z-axis) |
| $s_5$ | dif out of snrs. 120 of ass. 44 | (X-axis) |
| $s_6$ | output of autocollimator 144 | |
| $a_1$ | output of acc. 100 of ass. 30 | (Y-axis) |
| $a_2$ | output of acc. 101 of ass. 30 | (Z-axis) |
| $a_3$ | output of acc. 100 of ass. 32 | (Y-axis) |
| $a_4$ | output of acc. 101 of ass. 32 | (Z-axis) |
| $a_5$ | output of acc. 130 of ass. 44 | (X-axis) |
| $a_6$ | output of off-axis accel 150 | |
| $I_1$ | input to coils 83 of ass. 30 | (Y-axis) |
| $I_2$ | input to coils 82 of ass. 30 | (Z-axis) |
| $I_3$ | input to coils 83 of ass. 32 | (Y-axis) |
| $I_4$ | input to coils 82 of ass. 32 | (Z-axis) |
| $I_5$ | input to coils 116 of ass. 44 | (X-axis) |
| $I_6$ | input to actuator assembly 160 | ($T_{roll}$) |

As will be more evident hereinafter this data will be sufficient to determine the forces and torques applied to the mass during the testing period for all six degrees of freedom.

Referring to FIG. 14, the eighteen signals are applied to a corresponding eighteen inputs of the multiplexer 250. The multiplexer output is connected to the input of an ADC 252, which in turn is connected to a data processor 254.

The ADC 252 samples the input signal at a predetermined sampling rate, preferably 240kHz, although this can vary. The ADC 252 preferably provides a 16 bit output signal. The clocking signal for ADC 252 is provided by the data processor 254.

The data processor is connected to a data storage device 256 and to a display/output device 258. The data processor 254, data storage device 256 and display/output device 258 may be any type of computer system, and preferably is a personal computer manufactured by Core Computer of Boca Ratan, Fla., having a 40 megabyte storage, because of its low latency factor of one. It should be evident that other systems can be used depending upon the rate and amount of incoming data during the testing period. The multiplexer is clocked by the data processor at the preferred sampling rate of 240kHz so that the individual signals are fed into the data processor sequentially.

Figure 15:
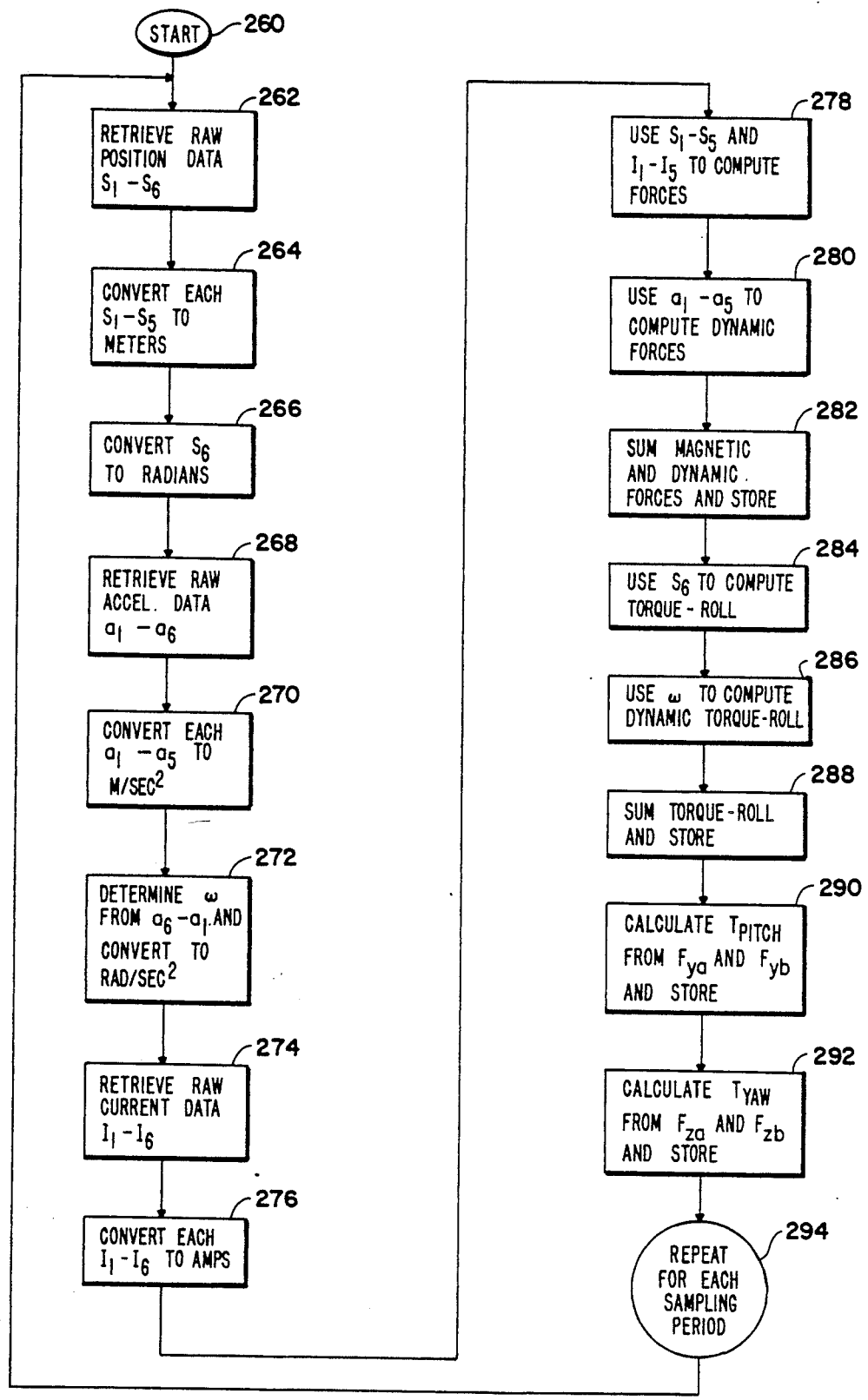
FIG. 15 is a flow chart illustrating the use of the acquired data to compute the forces and torques applied to the mass following the testing period.

Since all data is collected in its raw form, following the acquisition of data during the testing period, in order to analyze the data, the data must first be converted to the appropriate units in order to carry out the proper calculations. All calculations can be carried out by data processor 254. The calculations can be carried out for each sampling period separately. As shown in FIG. 15, the analysis starts at step 260. The next step 262 is to retrieve the raw data from the signals $s_1$–$s_5$ for the sampling period under analysis from the data storage device 5 256. The values of $s_1$–$s_5$ are each converted to meters at step 264. At step 266 the value of $s_6$ is converted into radians. At step 268, the data relating to $a_1$–$a_6$ for the sampling period under analysis is retrieved from storage device 256 and at step 270, the values of $a_1$–$a_5$ are each converted to m sec$^2$, and the value of $\omega$ is determined from the outputs of $a_1$ and $a_6$ in rad/sec$^2$ according to equation (4) at step 272. Finally, at steps 274 and 276, the values of $I_1$–$I_6$ are retrieved for the sampling period under analysis and converted to amperes.

Figure 16:
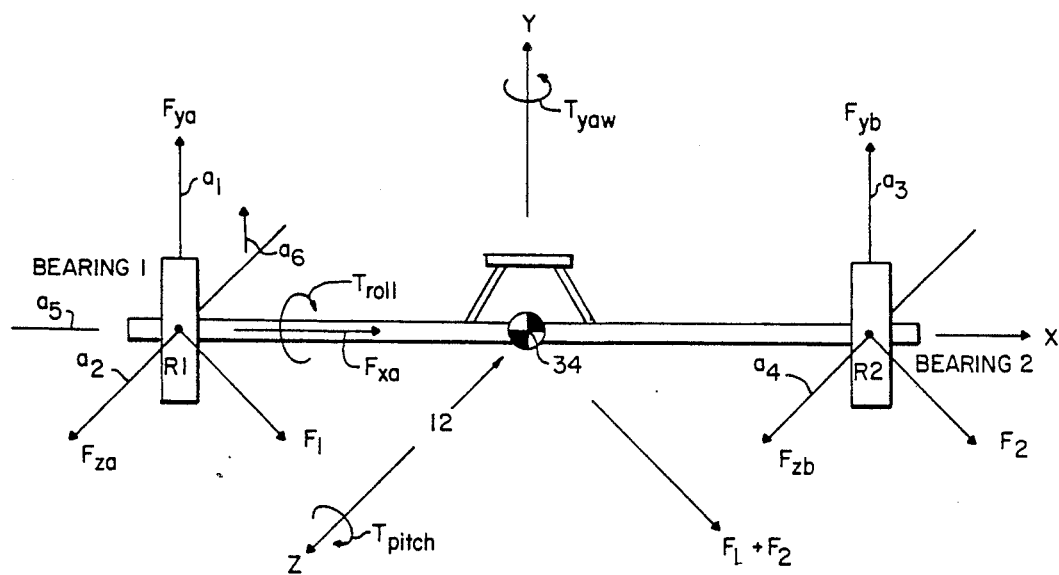
FIG. 16 is a schematic illustration for facilitating an understanding of the use of the acquired data to compute the forces and torques operating on the mass.

The eighteen data values for each sampling period are now provided for a particular sampling period for calculating the vectored force components and torques so that the magnitude and direction of the forces and torques acting on the mass 12 can be determined. The calculations are based on the following relationships described with reference to FIG. 16. As shown in FIG. 16, any force components $F_x$ along the X-axis whether at the bearing assembly 30 or assembly 32, will be sensed by the pair of proximity sensors 120 and accelerometer 130. Force components $F_y$ applied in the Y-axis at each of the bearing assemblies 30 and 32 are sensed by the respective pair of proximity sensors 90 and accelerometer 100 of the corresponding bearing assembly. The two Y components $f_{ya}$ and $f_{yb}$ can be used to compute the resulting Y-axis force component of the applied force $F_y$ which is a function of the combined values of the two pairs of proximity sensors 90 and accelerometers 100, as indicated by the following equation:

$$F_y = f_{ya} + f_{yb}. \qquad (7)$$

In a similar manner force component $F_z$ applied in the direction of the Z-axis at each of the bearing assemblies 30 and 32 are sensed by the respective pairs of proximity sensors 91 and accelerometer 101 of the corresponding bearing assembly. The two Z components $f_{za}$ and $f_{zb}$ can be used to compute the resulting Z-axis force component of the applied force $F_z$ as a function of the combined values provided by the two proximity sensors 91 and accelerometers 101, as indicated by the following equation:

$$F_z = f_{za} + f_{zb}. \qquad (8)$$

As indicated by steps 278–282 in FIG. 15, each of the linear force components are computed using the values derived from signals $s_n$, $a_n$ and $I_n$ in equations (1) and (2), above. Specifically, the value of $F_x$ is computed as follows:

$$\begin{aligned} F_x &= k_b I^2/g^2 + ma \\ &= k_b I_5^2/s_5^2 + ma_5 \end{aligned} \qquad (9)$$

wherein $F_x$ is the force (Newtons) in the X-axis direction;

$s_5$ is the gap (in meters) between the thrust plate 110 and core member 112 derived from the signal $s_5$;

$k_b$ is a proportional constant;

$I_5$ is the current (amps) applied to the coil assembly 116 derived from the signal $I_5$;

m is the mass (kgms) being moved along the X-axis; and $a_5$ is the acceleration (m/sec$^2$) derived from the signal $a_5$.

The values of $f_{ya}$ and $f_{yb}$ are each calculated in the same manner, using the values derived from $s_1$, $a_1$ and $I_1$ to calculate $f_{ya}$ and the values derived from $s_3$, $a_3$ and $I_3$ to calculate $f_{yb}$. The values of $f_{ya}$ and $f_{yb}$ are added together vectorially in order to determine $F_y$. Similarly, the values of $f_{za}$ and $f_{zb}$ are each calculated in the same manner, using the values derived from $s_2$, $a_2$ and $I_2$ to calculate $f_{za}$ and $s_4$, $a_4$ and $I_4$ to calculate $f_{zb}$. The values of $f_{za}$ and $f_{zb}$ added vectorially to provide $F_z$. The three components $F_x$, $F_y$ and $F_z$ can then be added vectorially to provide the vectored value of the composite force.

When calculating torque, the angular movement of the shaft about the X-axis, i.e., the roll, is a function of the amount of rotation sensed by the autocollimator assembly 140 and the angular acceleration determined from the signals $a_1$ and $a_6$ in accordance with equation (3). Equations (5) and (6) are used to calculate the value of torque associated with roll of the mass about the X-axis; wherein:

$$T_{roll} = T_a + T_b = k_a I_a + k_b \omega \qquad (10)$$

wherein $I_a$ is determined from the value of $I_6$ and $s_6$, while $\omega$ is determined from $a_1$ and $a_6$ from equation (3) above.

The torque about the Z-axis pitch can be easily determined from the values of $f_{ya}$ and $f_{yb}$, while the torque about the Y-axis, yaw, can be easily determined from the values of $f_{za}$ and $f_{zb}$. The pitch (the amount of torque about an axis in the direction of the Z-axis) is provided as a function of the difference between the two sensed values of the force components f and $f_{yb}$ as indicated by the following equation:

$$T_{pitch} = (f_{ya} - f_{yb}) \times R; \qquad (11)$$

wherein R is the moment arm, i.e., the distance from the Z-axis at which the torquing force is applied.

The yaw (the amount of torque about an axis in the direction of the Y-axis) is provided as a function of the difference between the two sensed values of the force components $f_{za}$ and $f_{zb}$ as indicated by the following equation:

$$T_{yaw} = (f_{za} - f_{zb}) \times R; \quad (12)$$

wherein R is the moment arm, i.e., the distance from the Y-axis at which the torquing force is applied.

All of the above calculations of $F_x$, $F_y$, $F_z$, $T_{roll}$, $T_{pitch}$ and $T_{yaw}$ steps can be carried out by the data processor 254 using matrix computations in a well known manner. As indicated at 294 in FIG. 15, steps 262-292 can be repeated as may be required for any and all of the sampling periods during which data was acquired during the testing period.

Thus, the system 10 provides an improved system for measuring both forces and torques exerted on a mass 12 with respect to all six degrees of freedom. The system is less sensitive to mechanical vibrations and resonances induced in the system as a result of the applied forces and torques because the mass is electromagnetically suspended in electromagnetic bearing assemblies. The bearing assemblies include servo systems with extremely fast response time to isolate the mass in a stable position during the test period. The acquisition of data, however, is not limited by the bandwidth of the servo loops. The use of low pass filters having a low pass cutoff frequency (in the preferred arrangement 5kHz) well above the bandwidth of the servo loop (in the preferred arrangement 2kHz) allows for force and torque measurements well above the servo loop bandwidth.

Figure 17:
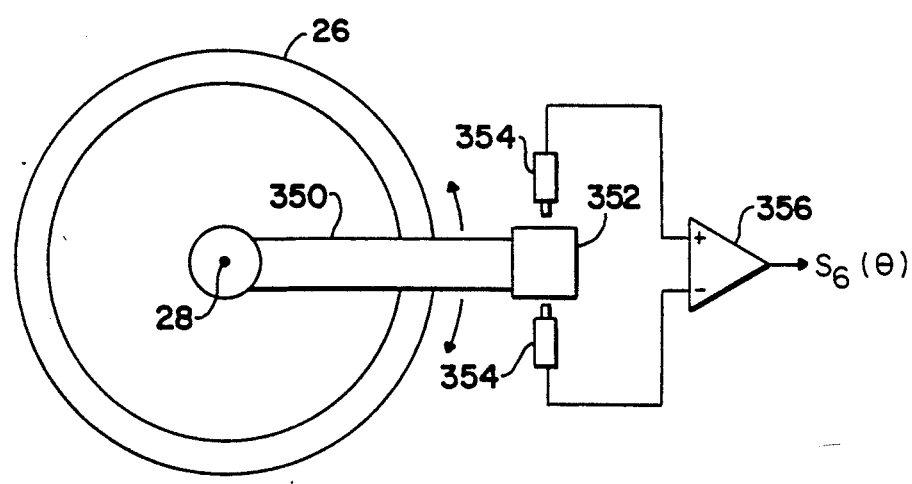
FIG. 17 is a partial cross-sectional view and partial schematic view showing an alternative arrangement for sensing roll of the mass about the X-axis.

Various changes can be made to the present invention without departing from the scope of the present invention. For example, an alternative device for measuring angular rotation of the shaft 26 about the axis 28, using proximity sensors of the type described above with respect to FIG. 4, is shown in FIG. 17. As shown in FIG. 17, a shaft 350 is connected to rotate about the axis 28 in the Y'-Z' plane, at least through a limited angle. The shaft includes a portion of electromagnetically conductive material so as to form, for example, a tab 352. A pair of proximity sensors 354, identical to the sensors 90, 91 and 120 are disposed in opposing relation, on opposite sides of the tab 352 at a location spaced from the shaft axis 28. As the shaft is angularly displaced about the axis 28, the displacement will be sensed by the two proximity sensors. The latter are connected to the input of a differential device, such as a differential amplifier 356, for detecting the difference between the output of the two sensors, and providing an output signal representative of the angular displacement of the shaft. Specifically, the angular displacement of the shaft from a predetermined reference position is given by the following equation:

$$\theta = \cos^{-1}(d/R); \quad (13)$$

wherein $\theta$ is the angle of displacement from a predetermined reference position;

d is the lateral displacement of the tab about the axis 28 as measured by the proximity sensors 354; and R is the radial position of the sensors relative to the X-axis.

Since certain other changes may be made in the above apparatus without departing from the scope of the invention herein involved, it is intended that all matter contained in the above description or shown in the accompanying drawing shall be interpreted in an illustrative and not in a limiting sense.

What is claimed is:

1. A system for measuring a force applied to a mass so that the magnitude and direction of the force can be determined, said system comprising, in combination:
   means for mounting said mass so that the mass is suspended in a predetermined position and orientation relative to a three-dimensional coordinate system defining three mutually perpendicular axes;
   means for generating a plurality of signals as a function of the measured force components of the force applied to the mass along the respective axes, said means for generating comprising:
      first means for generating a first plurality of signals as a function of the measured axial displacement of said mass along each of said three mutually perpendicular axes;
      second means for generating a second plurality of signals as a function of the measured acceleration of said mass along each of said three mutually perpendicular axes; and
   means, responsive to said first and second plurality of signals, for providing counter forces on the mass so as to maintain the mass in the predetermined position and orientation; and
   means for processing said first and second plurality of signals for determining the magnitude and direction of said force applied to said mass as a function of said force components.

2. A system according to claim 1, wherein said means for mounting said mass includes means for electromagnetically suspending said mass in said predetermined position and orientation.

3. A system according to claim 2, wherein one of said axes is a reference axis, and said means for measuring includes (a) means for measuring the force component in the direction of each of at least two of said three mutually perpendicular axes at each of two locations along said reference axis and (b) means for measuring the component along the third of said three axes at least at one location along said reference axis.

4. A system according to claim 2, further including means for measuring torque applied to said mass about each of said three mutually perpendicular axes.

5. A system according to claim 4, wherein one of said axes if a reference axis, said means for measuring torque includes means for generating a third plurality of signals as a function of the measured angular displacement of said mass about said reference axis relative to a predetermined angular orientation and said means for processing includes means for processing said third plurality of signals for determining the magnitude and direction of said torque about said reference axis.

6. A system according to claim 5, wherein said means for measuring torque includes means for measuring the pitch of said mass, said means for measuring pitch includes means for generating a fourth plurality of signals as a function of the difference between the force components measured by said means for measuring at each of said two locations along said reference axis in the direction of one of said three axes and said means for processing includes means for processing said fourth plurality of signals for determining the magnitude and direction of said pitch.

7. A system according to claim 6, wherein said means for measuring torque includes means for measuring the yaw of said mass, said means for measuring yaw includes means for generating a fifth plurality of signals as a function of the difference between the force components measured by said means for measuring at each of said two locations along said reference axis in the direction of a second of said three axes, and said means for processing includes means for processing said fifth plurality of signals for determining the magnitude and direction of said yaw.

8. A system according to claim 1, wherein said means for mounting said mass includes support means for supporting said mass so that said support means defines said three mutually perpendicular axes with one of said axes defining a reference axis, and said first means includes (a) at least one sensor for measuring axial displacement of said support means along said reference axis from a reference position, (b) at least two sensors for measuring the radial displacement of said support means relative to said reference axis in the direction of a second of said three axes at least at two locations along said reference axis, and (c) at least two sensors for measuring the radial displacement of said support means relative to said reference axis in the direction of a third of said three axes at least at two locations along said reference axis.

9. A system according to claim 8, wherein said second means includes (a) first accelerometer means for measuring the acceleration component of said support means in the direction of said reference axis, (b) second accelerometer means for measuring the acceleration component of said support means in the direction of said second of said three axes at each of said two locations along said reference axis, and (c) third accelerometer means for measuring the acceleration component of said support means relative to said reference axis in the direction of the third of said three axes at each of said two locations along said reference axis.

10. A system for measuring the magnitude and direction of a force applied to a mass, said system comprising, in combination:
means for mounting the mass so that the mass is suspended in a predetermined position and orientation relative to a three-dimensional coordinate system defining three mutually perpendicular axes;
force measurement means for measuring the force components of the force applied to the mass along the respective axes;
counterforce means for providing counter forces on the mass in response to measurements made by said force measurement means so as to maintain the mass in the predetermined position and orientation, said counterforce means including a rotary actuator for causing said mass to rotate along one of said three mutually perpendicular axes and a plurality of linear actuators for causing said mass to move linearly along each of said three mutually perpendicular axes; and
means for determining the magnitude and direction of the force applied to the mass as a function of the measured force components.

11. A system for measuring the magnitude and direction of forces applied to a mass, the system comprising:
first means for suspending a mass in a predetermined position and orientation relative to three mutually-perpendicular axes;
second means for measuring the force components of a force respectively applied to the mass along each of said three mutually-perpendicular axes;
third means responsive to correction signals, for providing counter forces to the mass so as to maintain said mass suspended in said predetermined position and orientation; and
fourth means, responsive to said second means, for (a) determining the counter forces required to counteract said force components applied to said mass so as to maintain said mass in said predetermined position and orientation, and (b) generating said correction signals as a function of said predetermined counter forces; and
fifth means for calculating (a) the magnitude and direction of the force applied to the mass as a function of said correction signals, (b) the torque associated with the roll of the mass about one of said three axes based on said information in said correction signals, (c) the torque associated with the pitch of the mass about a second of said three axes based on said information in said correction signals; and (d) the torque associated with the yaw of the mass about a third of said three axes based on said information in said correction signals.

* * * * *